United States Patent [19]

Paff et al.

[11] Patent Number: 5,430,511
[45] Date of Patent: Jul. 4, 1995

[54] CONTROLLER FOR A SURVEILLANCE ASSEMBLY

[75] Inventors: Robert Paff, Boca Raton; Jon D. Buzzard, Margate; Howard M. Schenkel, Boca Raton; Edwin Thompson, Loxahatchee, all of Fla.

[73] Assignee: Sensormatic Electronics Corporation, Deerfield Beach, Fla.

[21] Appl. No.: 171,215

[22] Filed: Dec. 21, 1993

[51] Int. Cl.$^6$ .............................. G03B 29/00
[52] U.S. Cl. ..................... 354/81; 348/143; 341/22; 74/471 X
[58] Field of Search ............... 354/75, 76, 81; 348/143, 375; 341/2, 5, 20, 22; 74/471 R, 471 X; 200/6 A; 345/161; 273/148 R, 148 A; 352/243

[56] References Cited

U.S. PATENT DOCUMENTS

| 4,469,330 | 9/1984 | Asher | 341/22 X |
| 4,782,327 | 11/1988 | Kley et al. | 341/2 |
| 4,945,367 | 7/1990 | Blackshear | 354/81 |

Primary Examiner—Howard B. Blankenship
Attorney, Agent, or Firm—Robin, Blecker, Daley & Driscoll

[57] ABSTRACT

A controller for use in generating signals for enabling control of a plurality of functions of a camera and lens assembly comprising a movable member having a first region adapted to be engaged by a user's first finger for moving the movable member in a plurality of directions to develop first and second signals for controlling first and second functions of the camera and lens assembly, and at least a plurality of further regions with each of the further regions being finger reachable by another finger of the user when the user's first finger is engaging the first region and being adapted to be finger actuatable to develop a signal for enabling control of a further function of the camera and lens assembly.

21 Claims, 4 Drawing Sheets

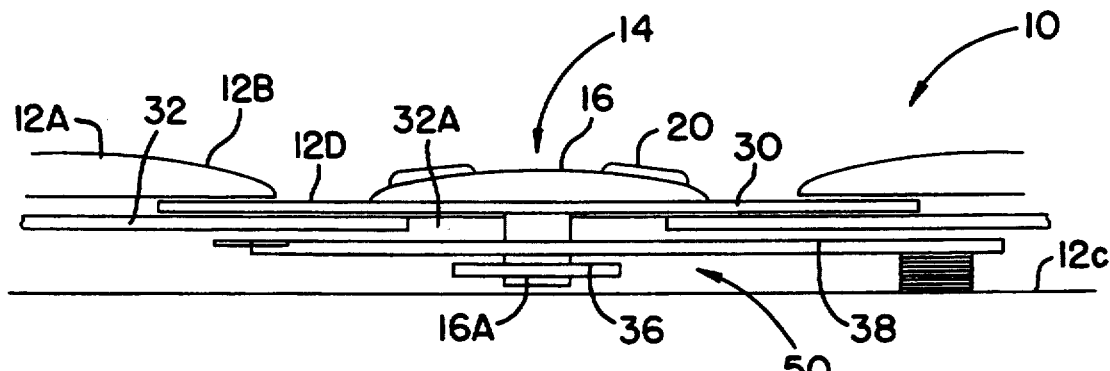
FIG. 2
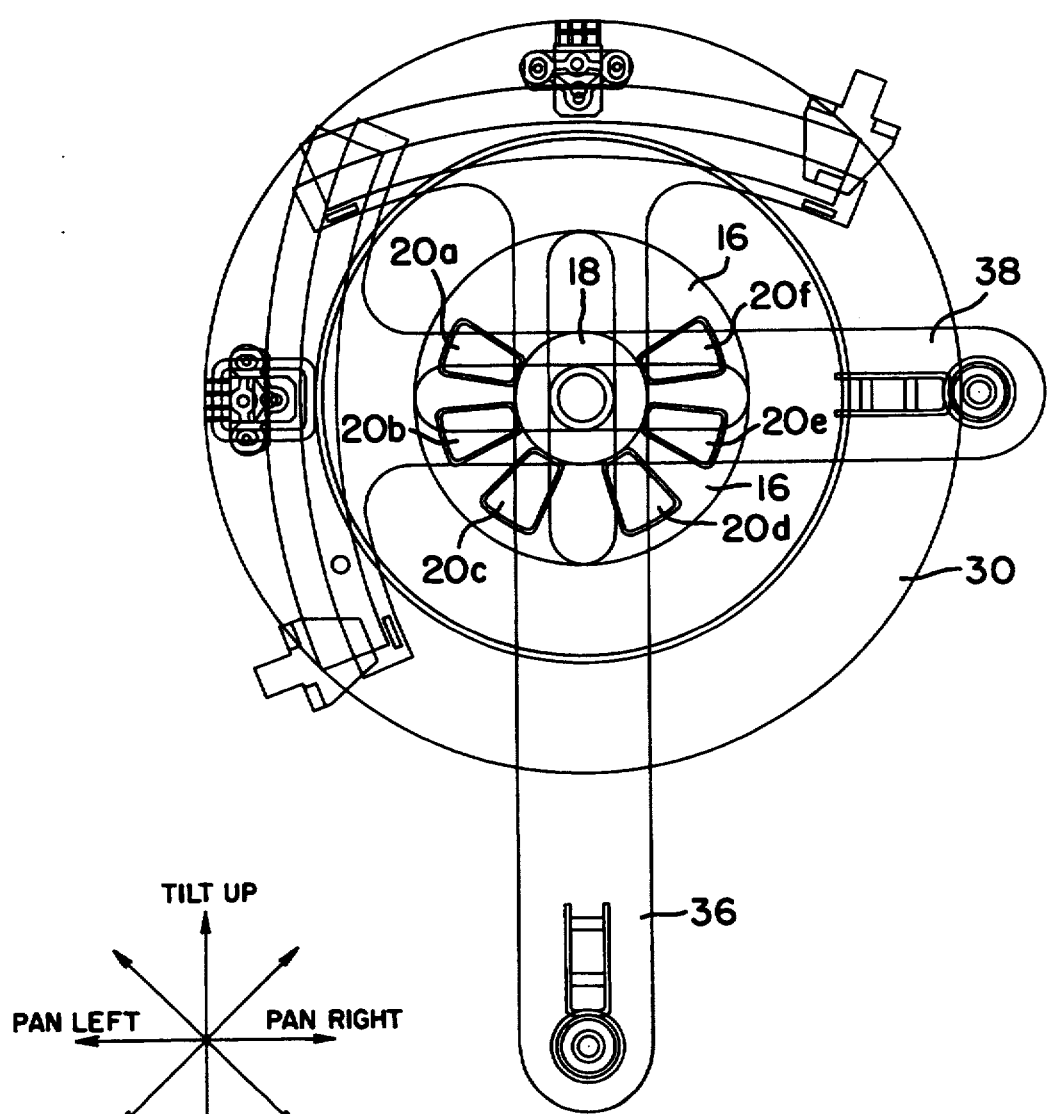
FIG. 3
FIG. 3A

CONTROLLER FOR A SURVEILLANCE ASSEMBLY

BACKGROUND OF THE INVENTION

This invention relates to a controller for video surveillance cameras and, in particular, to a controller which controls pan, tilt, zoom, focus and iris functions of video surveillance cameras in a closed-circuit television ("CCTV") security system.

The use of video cameras to monitor a location or premises has greatly increased over the years as a means for providing additional security and surveillance for the specified location. To increase the usefulness of video surveillance cameras, controllers have been designed to allow the user to operate and maneuver the cameras and their functions from a remote location. For example, various controllers have been designed to remotely operate and control the pan, tilt, zoom, focus and iris settings of video cameras and their lens assemblies. This allows the range and coverage realized by the cameras to be easily changed so as to adapt the cameras to various surveillance situations.

U.S. Pat. No. 4,945,367 to Blackshear ("Blackshear") discloses one example of a surveillance camera system with a camera and a computerized control system mounted in a spherical housing. The control system is controlled from a remote location by a hand-held joystick which controls panning and tilting of the camera with variable speed control as well as the operation of the camera's zoom, focus and iris settings. Panning of the camera occurs when the joystick is deflected side-to-side, while tilting occurs when the joystick is pushed forward or pulled backward.

The zooming function of the lens assembly with a fixed speed control is operated by a rotary movement of a knob located on the upper position of the joystick. Twisting of the knob on the joystick clockwise allows the lens to zoom-in, while twisting of the knob counter-clockwise allows the lens to zoom-out. The focus and iris functions of the lens assembly are manually controlled by switches mounted on the controller and cannot be operated simultaneously when panning or tilting.

While the above-described controller of the '367 patent enables adequate remote operation and control of a video surveillance camera, the controller has certain drawbacks. One drawback is that it requires two-handed operation for simultaneously controlling the panning and tilting and the lens functions, i.e., zoom, focus or the like of the camera. This restricts the user to controlling only one camera at a time, since both hands of the user must be used. Further, this two-handed operation requires the user to look away from the video monitor to locate a particular function key on the controller, thereby interrupting the tracking of the subject.

Other controllers which have been developed have other limitations. Thus, many of these controllers have a fixed speed for controlling panning and tilting of the camera being controlled. Therefore, if the user attempts to track a person, the pan and tilt speeds of the controller cannot be adjusted in accordance with the movement of the person. In addition, if the user tries to zoom-in on a specific scene, the pan and tilt speeds move the camera too quickly resulting in "overshooting" the desired view. This speed control problem also occurs in the speed control of the lens functions of the camera, resulting in a particular lens function operating too rapidly or too slowly.

In addition, the program code of the current controllers which determines the operating characteristics and functionality of the camera is difficult to up-grade and maintain. Typically, the program code is stored in a Read-Only-Memory ("ROM") or in an Electrically Erasable Programmable Read-Only-Memory ("EEPROM"). If there is a programming error or a new feature needs to be added and the program code must be changed in the controller, the ROM/EEPROM of the controller must then be physically replaced with a new ROM/EEPROM containing the new program code.

It is therefore an object of the present invention to provide a controller which allows for single-handed control of the pan, tilt, zoom, focus and iris settings or functions of a video surveillance camera in a CCTV security system.

It is a further object of the present invention to provide a controller which allows for easy speed control of a video surveillance camera.

It is an additional object of the present invention to provide a controller with easy access key functions and locations to facilitate use of the controller by the user.

It is a further object of the present invention to provide a controller which allows for easily loading of a program code into the memory as well as the ability to designate the particular functions of the buttons based upon the user's preference.

It is an additional object of the present invention to provide a controller with a design and structure which permits ready and comfortable use.

SUMMARY OF THE INVENTION

In accordance with the principles of the present invention, the above and other objectives are realized in a controller for use in controlling a plurality of functions of a physical device wherein the controller comprises a movable member having a first region adapted to be engaged by a user's first finger for moving the member in a plurality of directions to develop first and second signals for controlling first and second functions of the physical device. The movable member also includes at least a plurality of further regions with each of the further regions being finger reachable by another finger of the user when the user's first finger is engaging the first region and being adapted to be finger actuatable to develop a signal for enabling control of a further function of the physical device.

In the embodiment of the invention to be disclosed hereinafter, the controller is used for controlling the panning, tilting, zooming, focusing and iris settings or functions of a video surveillance camera and its lens assembly. The controller comprises a support housing which supports the movable member. The latter movable member is in the form of a disc assembly which includes a movable disc having a recessed area forming the first region of the movable member and buttons adjacent to the recessed area forming the plurality of further regions of the movable member. The movement of the movable disc results in the generation of control signals for controlling the panning and tilting of the camera, while the actuation of the buttons results in the generation of control signals for controlling the zoom focus and iris functions of the lens assembly of the camera.

A linkage assembly affixed to the support housing supports the movable disc for lateral and longitudinal movement and means is provided for detecting this movement to develop the aforementioned control signals for controlling the pan and tilt functions. Increases in movement result in control signals indicative of higher control speeds for the particular function. The linkage assembly is further adapted to cause automatic return of the movable disc to a neutral position as well as to provide audible indication when the movable disc returns to each of its laterally neutral and longitudinally neutral positions.

The buttons provided for the zoom, focus and iris control signals result in control signals which depend upon the length of time that each button is actuated or depressed. Control signals corresponding to longer actuation times are indicative of higher control speeds for the functions.

The support housing of the controller is also adapted to support the disc assembly in a recessed area and to include a contoured underside and a palm rest area. An inclined keypad forward of the movable disc assembly is also provided on the support housing.

BRIEF DESCRIPTION OF THE DRAWINGS

The above and other features and aspects of the present invention will become more apparent upon reading the following detailed description in conjunction with the accompanying drawings, in which:

FIG. 2 is a partially cut away side view of the disc assembly and mechanical linkage of the controller of FIG. 1;

FIG. 3 is a top view partially cut away of the disc assembly and mechanical linkage of the controller of FIG. 1;

FIG. 3A shows the directions of movement of the disc assembly of FIG. 3 and the corresponding movement of the controlled functions;

DETAILED DESCRIPTION

Figure 1:
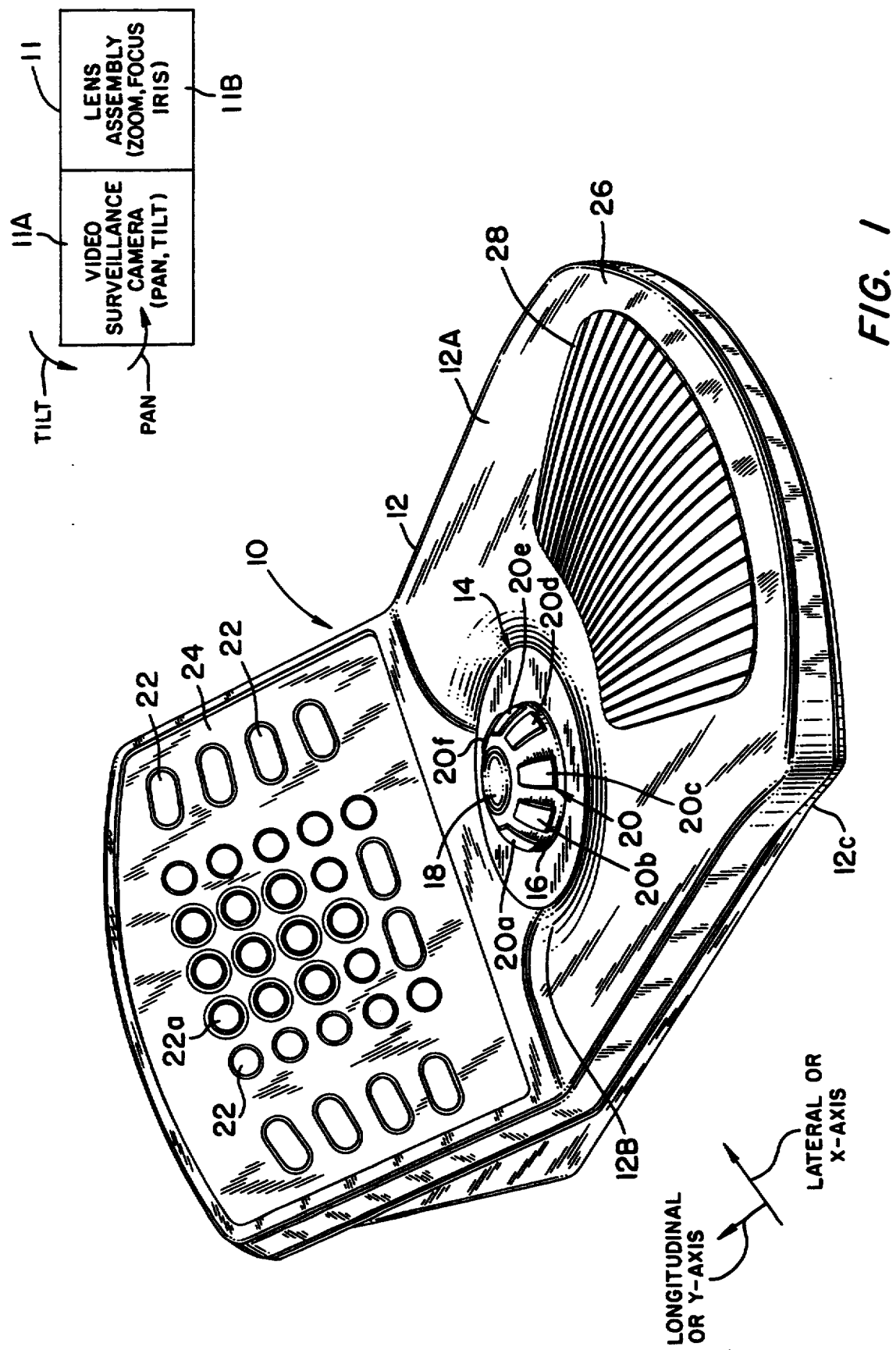
FIG. 1 illustrates a controller in accordance with the principles of the present invention.

FIG. 1 shows a controller 10 in accordance with the principles of the present invention. In the present illustrative case, it is assumed that the controller 10 is to be used in a CCTV security system to generate control signals for controlling the pan, tilt, zoom, focus and iris functions of a surveillance assembly 11. More particularly, the controller 10 generates control signals for controlling the pan and tilt settings of a video surveillance camera 11A of assembly 11 and the zoom, focus and iris settings of a lens assembly 11B of assembly 11.

As shown, the controller 10 comprises a support housing 12 which movably supports a disc assembly 14 within a central recessed area 12B of the housing 12 so as to prevent objects placed on a top wall 12A of the housing from interacting with the assembly 14. A movable disc 16 of the disc assembly 14 is provided with an indentation or recessed area 18 adapted to be engaged by a first finger of a user, i.e., the middle or index finger, for moving the movable disc 16 in a lateral or X-axis direction and/or a longitudinal or Y-axis direction. As will be discussed more fully below, the lateral and longitudinal direction movements of the disc 18 result in the generation by the controller 10 of control signals for controlling the panning and tilting, respectively, of the video surveillance camera 11A of the surveillance assembly 11.

The movable disc 16 also includes a plurality of keys or buttons 20 which when actuated cause the controller 10 to generate further control signals for controlling the zoom, focus and iris settings of the lens assembly 11b of the surveillance assembly 11. In the case shown, the buttons 20 include a zoom-in button 20a, a zoom-out button 20b, a focus-near button 20c, a focus-far button 20d, an iris-open button 20e and an iris-close button 20f.

Each of the buttons 20a-20fis positioned in the disc 16 so as to be finger reachable or actuatable by another finger of the user when the middle finger of the user is engaging the indentation 18 of the disc 16. This positioning enables actuation of one or more of the buttons 20a-20fby an appropriate finger, while the movable disc 16 is being moved in the lateral and longitudinal directions by the index finger of the user. As a result, pan and tilt control signals and, simultaneously, zoom, focus and/or iris control signals can be generated by a user operating the controller with a single hand. The controller 10 thus allows for one-handed maneuverability of the controller for control of the surveillance assembly 11.

FIGS. 2 and 3 illustrate the disc assembly 14 of the controller 10 in more detail. As shown, the movable disc 16 of the disc assembly 14 is supported on a disc skirt 30 which occupies an opening 12D in the recessed area 12B of upper wall 12A of the housing. The disc skirt 30 also extends over a further opening 32A in a support plate 32 included in the housing 12 for providing a support and bearing surface for the skirt.

A drive shaft 16A of the disc 16 extends through an opening in the disc skirt 30 and through the opening 32A in the support plate 32. The shaft 16A is captured by a tilt pivot arm 38 and a pan pivot arm 36 of a mechanical linkage assembly 50 supported on the bottom wall 12C of the housing 12. The mechanical linkage 50 permits simultaneous lateral and longitudinal movement or displacement of the disc 16 and includes a means for translating this movement into signals indicative thereof for generating corresponding pan and tilt control signals for the camera 11A of the surveillance assembly 11, as above-described.

Figure 6:
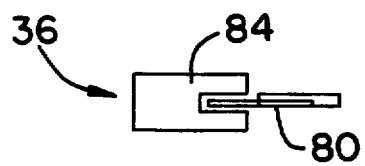
FIG. 6 is a cross-sectional view taken along the line B—B of FIG. 4 showing the details of the sensor used with the mechanical linkage of FIG. 4.
Figure 5:
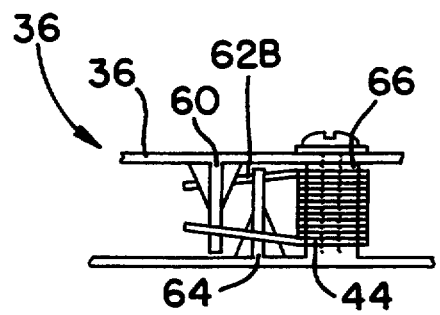
FIG. 5 is a cross-sectional view taken along the line A—A of FIG. 4 showing the details of one of the pivots of the mechanical linkage of FIG. 4.
Figure 4:
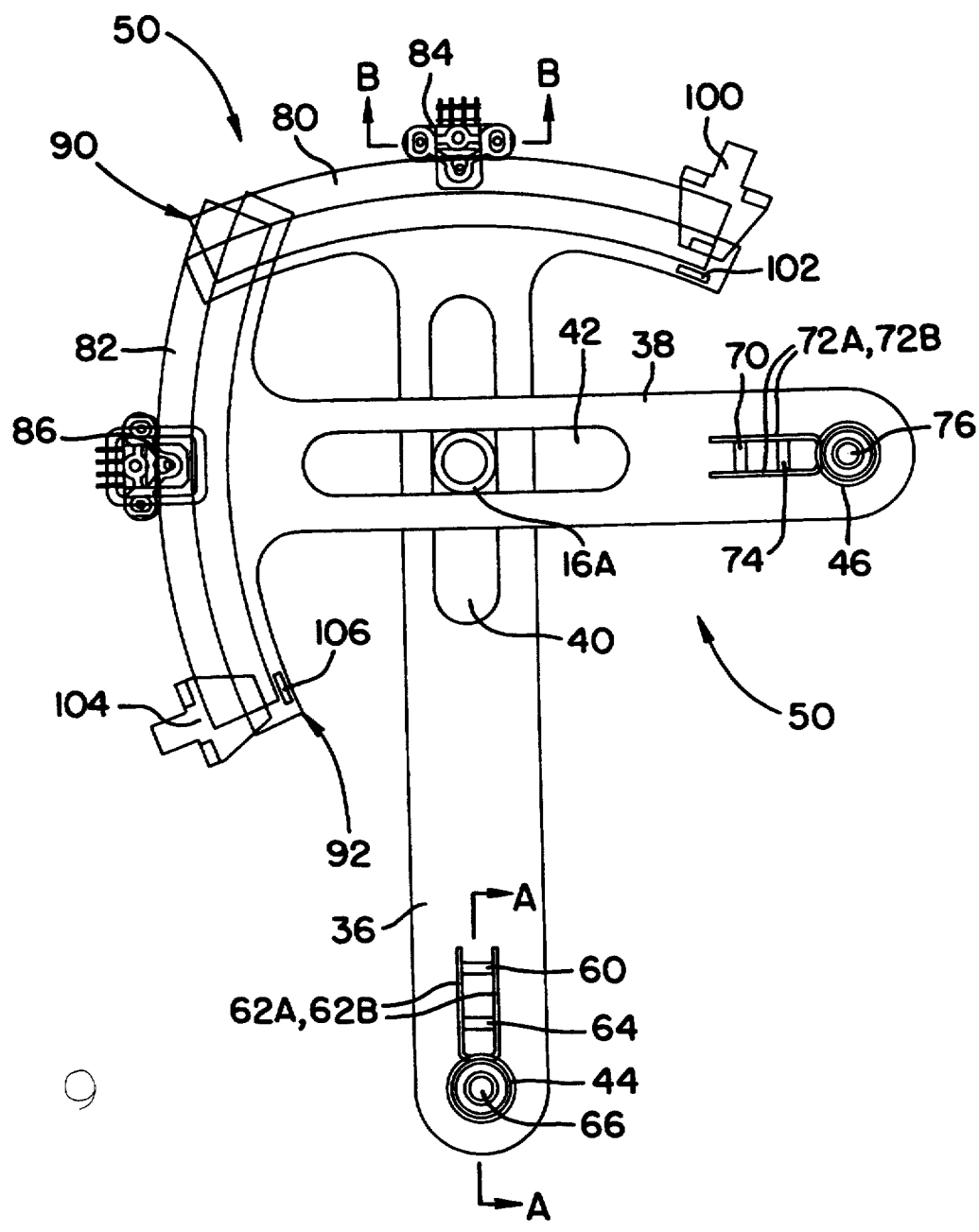
FIG. 4 is a top view partially cut away of the mechanical linkage of the controller of FIG. 1.

FIG. 3A shows representative pan and tilt control effected by the control signals developed from the signals generated by the linkage 50 based on respective longitudinal and lateral displacements of the disc 16. Any location between the vertical and horizontal axes will include a portion of pan and tilt. FIGS. 4–6 illustrate the linkage 50 in greater detail.

As shown in FIG. 4, the pan pivot arm 36 extends in the longitudinal direction and the tilt pivot arm 38 extends in the lateral direction and lies above the pan pivot arm 36. The pivot arms 36 and 38 include slots 40 and 42, respectively, which crisscross and which, in their overlap area, capture the drive shaft 16A of the disc 16 so that movement of the disc causes simultaneous pivoting of the arms.

The pan pivot arm 36 has a pan drive post 60 which moves with the arm, a pan stationary post 64 which remains immobile, a pan pivot point 66 which is fixed and about which the pan pivot arm 36 radially pivots, a pan torsion spring 44 which surrounds the pivot point 66 and first and second spring arms 62A and 62B which abut the outer sides of the posts 60 and 64, respectively. The tilt pivot arm 38 is similarly configured with a tilt drive post 70, a tilt stationary post 74, a tilt pivot point 76, a tilt torsion spring 46 and first and second spring arms 72A and 72B.

The pivot points 66 and 76 are affixed to the bottom wall 12C of the support housing 12 so as to allow the arms 36 and 38 to pivot radially thereabout upon respective lateral and longitudinal movement of the disc 16 and shaft 16A. Upon such movement, the pan torsion spring 44 and tilt torsion spring 46 are placed under tension by the post 60 interacting with spring arm 62A or 62B and the post 70 interacting with the spring arm 72A or 72B, depending upon the direction of lateral and longitudinal movement. This tension allows the springs to automatically return the arms 36 and 38 to a neutral or centered position when the disc 16 is released. Also, such return is accompanied by the interaction of the posts 60 and 70 with the other spring arms 62A or 62B and 72A or 72B, which have been held stationary by the posts 64 and 74, respectively. This interaction provides an audible indication of the respective neutral positions of each of the arms.

In the present case, the pan and tilt pivot arms 36 and 38 have arc-shaped ends 90 and 92 upon which are mounted pan and tilt displacement interfaces 80 and 82. These interfaces are monitored by pan and tilt displacement detectors 84 and 86.

The combination of displacement interface 80 and the displacement detector 84 translates the lateral displacement of the arm 36 and, therefore, disc 16 into an electrical signal indicative of such lateral displacement. Likewise, the combination of displacement interface 82 and displacement detector 86 translates the longitudinal displacement of the arm 38 and, therefore, the disc 16 into an electrical signal indicative of such longitudinal displacement. These signals are then processed into appropriate control signals for pan and tilt control as described in greater detail hereinbelow.

The arc-shaped end 90 of the pivot arm 36 also carries a pan neutral tab 102. A similar tilt neutral tab 106 is carried by the arc-shaped end 92 of the pivot arm 38. Pan and tilt neutral detectors 100 and 104 detect these tabs so that the neutral positions of the arms 36 and 38 and, therefore, the disc 16 can be confirmed and verified.

Each of the displacement detectors 84 and 86 can take on a number of forms. In one form, each displacement detector may comprise an optical encoder and the associated displacement interface a mylar material having alternating opaque and transparent stripes. In such case, the optical decoder could be of the two channel quadrature type and would count output pulses as the stripes of the mylar displacement interface are passed by the decoder.

In particular, as the decoder accumulates pulses, the number of pulses would be indicative of the speed of the function (either pan or tilt) to be controlled. The direction of the control, in turn, would be determined by the phase of the pulses in the quadrature channels. If the pulses from one channel lead the pulses of the other channel by 90°, this would indicate a first control direction. However, if the pulses from the one channel lag the pulses from other channel by 90°, this would indicate an opposite or second control direction.

Another form of displacement detector might be a light source and light sensitive receiver. In this case, the displacement interface could be a mylar material having a pattern that causes the light level reaching the receiver to vary from minimum to maximum. An accumulation of changes from minimum to maximum would then be indicative of the speed of the function to be controlled.

The controller 10 is operated by the user inserting the desired finger into the indentation 18 located on the movable disc 16 and giving the disc the desired lateral and/or longitudinal displacement. As the user moves the disc 16 via the indentation 18, the user's fingers stay in position above the buttons 20a–20f. This allows the user to develop with one hand pan and tilt control signals, and also iris, focus and zoom control signals by pressing the appropriate ones of the buttons 20a–20f.

The degree of displacement of the disc 18 determines the level of the corresponding control signal, as above-noted, which, in turn, is indicative of the speed at which the corresponding pan or tilt function should be changed. Thus, if the disc 16 is displaced slightly lateral to the right, slow pan movement to the right is effected. If the movable disc 16 is gradually moved to the extreme laterally or rightmost position, the speed gradually increases until it reaches a maximum speed. Similarly, if the disc 16 is moved slightly longitudinally upward, slow tilt movement upward is effected. If the disc 16 is moved to the extreme longitudinal or upward position, the speed of upward movement gradually increases to a maximum speed.

The speeds of the zoom, focus and iris functions are determined by the amount of time the corresponding button is held down by the user. Quickly pressing and releasing a particular button, results in a slow control speed for the function while providing better accuracy. Pressing and holding the button, gradually increases the control speed to the maximum rate resulting in a large change in the function in a short period of time.

Figure 7:
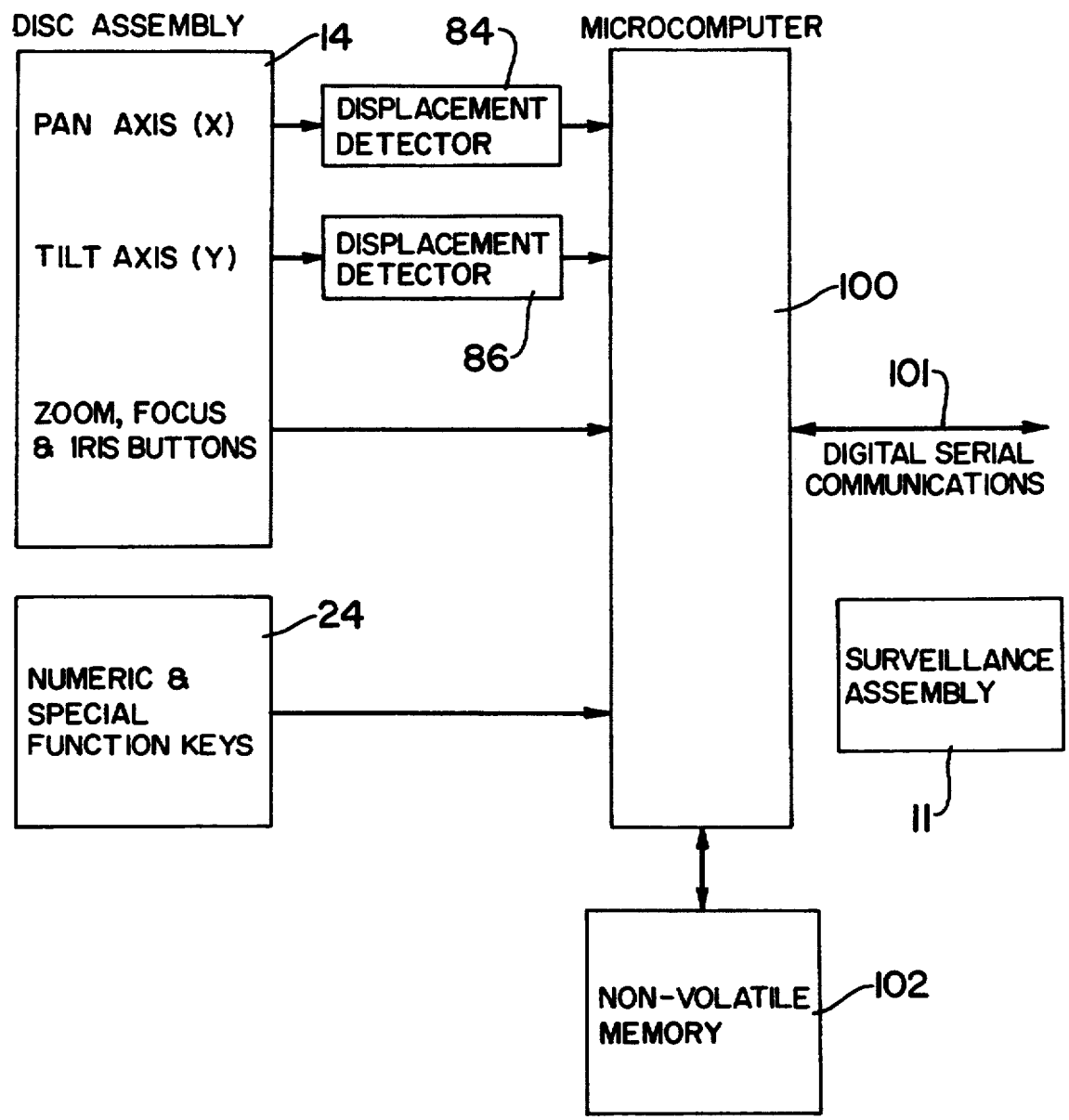
FIG. 7 is a block diagram of the operational components of the controller of FIG. 1.

As above-indicated, the controller 10 forms respective pan, tilt, zoom, focus and iris control signals from the signals generated by the disc assembly 14 and the buttons 20a–20f. This is the accomplished in the controller 10 by a microcomputer 100. As shown in the block diagram in FIG. 7, the microcomputer 100 scans the signals from these elements, as well as those from the keypad area 24. The microcomputer then delivers the appropriate control signals to the surveillance assembly 11 over a digital serial communications link 101.

More particularly, the microcomputer 100 determines from its scanning operation of the signals generated by actuation of the buttons 20a–20f whether a particular focus, zoom or iris function is to be changed. Also, depending upon the length of time of the signal, i.e., the length of time the button is pressed, the microcomputer determines the speed of control for the function.

Likewise, based on the signals from the displacement detectors 84 and 86, the microcomputer 100 determines whether the pan and tilt functions are to be changed and the speed of the function. For example, a slight movement of the movable disc 16 to the right causes the pan displacement detector 84 to output an appropriate lateral displacement signal to the microcomputer 100. The microcomputer then interprets the signal and generates a slow speed pan right control signal. Continuing movement of the disc 16 to the right causes an increased pan displacement detector 84 output. The microcomputer 100 again interprets this signal and develops an increased speed pan right command for controlling the pan right function.

For operation of the microcomputer 100, the controller 10 also includes a non-volatile memory 102 such as a battery back-up Random Access Memory ("RAM") or Electrically Erasable Programmable Read-Only-Memory ("EEPROM"). The memory 102 stores program code for the microcomputer 100 and it also allows for such code to be directly altered by a host processor. As a result, a new program can be entered directly into the memory 102, thereby avoiding the necessity of replacing a physical component of the controller 10.

In addition, pre-defined user preferences can be stored in the memory 102 and automatically loaded into the controller 10 when the user activates the system. Examples of preferences which can be stored and adjusted include the layout of the zoom, focus, and iris buttons 20a-20f on the movable disc 16. Thus, for example, a right-handed user might want the zoom button to be located under the user's index finger on the left side of the movable disc 16, while a left-handed user might want the zoom button on the right side of the movable disc 16. Another preference, could be the minimum and maximum speeds for the camera functions based on the user's desires.

Turning again to the physical configuration of the controller 10 as shown in FIG. 1, in addition to the disc-assembly 14, the support housing 12 also includes a keypad 24 located at the back end of the housing. The keypad 24 is situated within easy reach of a user's fingers when the palm of the user's hand is resting on a palm rest area 26 located at the front end of the housing. Various function and numeric keys 22 and 22a located in the keypad 24 provide means for controlling other functions of the surveillance assembly and/or CCTV system. In the case shown, the keys 22 and 22a on the right half of the keypad 24 provide the same control as that on the left half side of the keypad. This redundancy allows for easy right and left handed operation of the keypad.

The area of the keypad 24 about each key 22a can be chamfered or grooved to permit easier location of the keys during operation. Also, the keypad is tilted, preferably at a 50° angle, and illuminated or backlighted to afford a better viewing angle and easier readability for the user. The angling of the keypad also reduces the distance of the numeric keys 22a from the user's hand when the palm of the user's hand is positioned on the palm rest area 26, thereby reducing fatigue on the user. The illumination or backlighting helps to present a visual contrast of any graphics or writing on the keypad, especially when used in an area with low lighting. The graphics on the keys are provided by interchangeable panels thereby allowing different languages or symbols to be displayed.

The palm rest 26 of the housing 12 is contoured to the shape of the user's palm to provide a comfortable surface. Ventilation grooves 28 in the palm rest 26 allow air to circulate under the user's palm to reduce sweating. In addition, the grooves 28 provide friction to allow for positioning of the user's palm, while operating the respective functions of the keypad 24 and disc assembly 14.

The bottom wall 12C of the housing 12 is contoured upward to accommodate the shape of a user's leg. This provides stability and comfort for the user if the user desires to position the controller 10 closer to the body.

The positioning of the keypad 24, the palm rest 26 and the movable disc 16 allows for all hand movements of the user to be within the natural alignment of the joints of the hand. This prevents the user from hyperextending a joint or producing harmful forces in opposition to the user's natural joint movement.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. A controller for use in generating signals for enabling control of a plurality of functions of a physical device, the controller comprising:

a housing;

a movable disc movably supported by said housing, said movable disc having a movable disc assembly including a movable disc and a linkage assembly for supporting said disc for lateral and longitudinal movement; and said movable disc having a first region adapted to be engaged by a first finger of a hand of a user for moving the movable disc in a plurality of directions, said movement of said movable disc being used to develop first and second signals for control of first and second functions of said physical device; and at least a plurality of further regions, each of said further regions being finger reachable by another finger of said hand of said user when said first finger of said user is engaging said first region and being adapted to be finger actuatable to develop a further signal for control of a further function of said physical device.

2. A controller in accordance with claim 1, further comprising:

first means for generating said first and second signals responsive to the movement of said movable disc;

and second means responsive to actuation of each of said further regions for generating a further signal.

3. A controller in accordance with claim 2, wherein:

said first region comprises a first surface area of said movable disc;

and said further regions each comprise a further surface area of said movable disc adjacent to said first surface area.

4. A controller in accordance with claim 3, wherein:

said first surface area includes an indentation for seating said first finger;

and each of said further surface areas includes a button supported in and accessible through an aperture in the further surface area.

5. A controller in accordance with claim 2, wherein:

said physical device is a surveillance assembly including a camera and lens assembly;

said functions of said physical device include panning and tilting of said camera and lens assembly; and focus, zoom and iris control of said camera and lens assembly;

said first and second functions are said panning and tilting functions;

said further functions include two or more of said focus, zoom and iris functions.

6. A controller in accordance with claim 2, wherein:

said linkage assembly includes first and second pivotally mounted arms each having a central slot and arranged so that the central slots of said first and second arms overlap;

and said disc includes a shaft which is captured in said central slots of said first and second arms where said central slots overlap.

7. A controller in accordance with claim 6, wherein:
said movable disc assembly includes means for returning said pivotally mounted arms to a neutral position upon release of finger engagement to said disc.

8. A controller in accordance with claim 7, wherein:
said movable disc assembly further includes means for providing an audible indication when each of said pivotally mounted arms is returned to its neutral position.

9. A controller in accordance with claim 6, wherein:
said first arm extends longitudinally and is pivotally mounted so as to undergo lateral displacement;
said second arm extends laterally and is pivotally mounted so as to undergo longitudinal displacement;
and said means for generating said first and second signals includes: first detecting means for detecting the lateral displacement of said first arm; and second detecting means for detecting the longitudinal displacement of said second arm.

10. A controller in accordance with claim 9, wherein:
said first signal is indicative of the speed of control of said first function based upon the degree of detected lateral displacement;
and second signal is indicative of the speed of control of said second function based upon the degree of detected longitudinal displacement.

11. A controller in accordance with claim 2, wherein:
said first and second signals are indicative of the speed of control of said first and second functions based upon the degree of lateral and longitudinal movement of said movable disc, respectively.

12. A controller in accordance with claim 2, wherein:
each said further signal is indicative of the speed of control of the corresponding further function based upon the length of time of actuation of the further region used to develop the further signal.

13. A controller in accordance with claim 2, further comprising:
a microcomputer responsive to the signals from said first and second means for developing control signals based thereon.

14. A controller in accordance with claim 13, further comprising:
a non-volatile memory for storing program code for said microcomputer.

15. A controller in accordance with claim 14, wherein:
said non-volatile memory comprises one of a RAM and an EEPROM.

16. A controller in accordance with claim 1, wherein:
the housing has a bottom wall, said bottom wall is contoured upward for placement on the leg of the user.

17. A controller in accordance with claim 1, wherein:
the housing has a top wall, said top wall has a centrally located recessed area; and
said movable disc is supported in said recessed area.

18. A controller in accordance with claim 16, further comprising:
an inclined keypad supported on an end of said housing forward of said movable disc.

19. A controller in accordance with claim 18, wherein:
the top wall of said housing is contoured rearward of said movable disc to form a palm rest.

20. A controller in accordance with claim 19, wherein:
said contoured top wall palm rest has grooves.

21. A controller in accordance with claim 18, wherein:
said keys of said keypad on the right half of said keypad and said keys of said keypad on the left half of said keypad are symmetric and provide like control.

* * * * *